Figure 1:
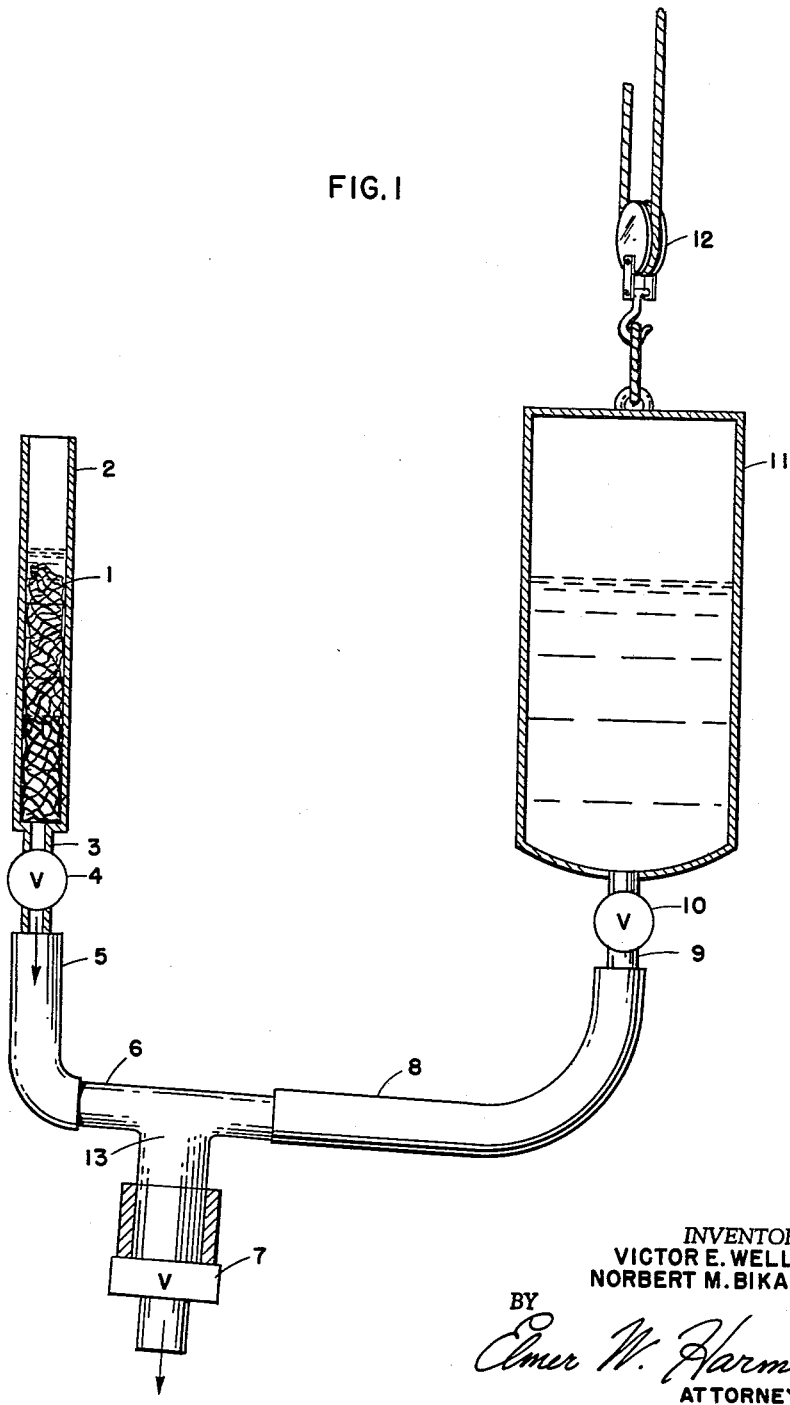

July 31, 1962 V. E. WELLMAN ETAL 3,046,775
APPARATUS FOR TREATING RETICULATE MATERIAL
Original Filed Sept. 25, 1957 2 Sheets-Sheet 1

INVENTORS
VICTOR E. WELLMAN
NORBERT M. BIKALES
BY
Elmer W. Harmon
ATTORNEY

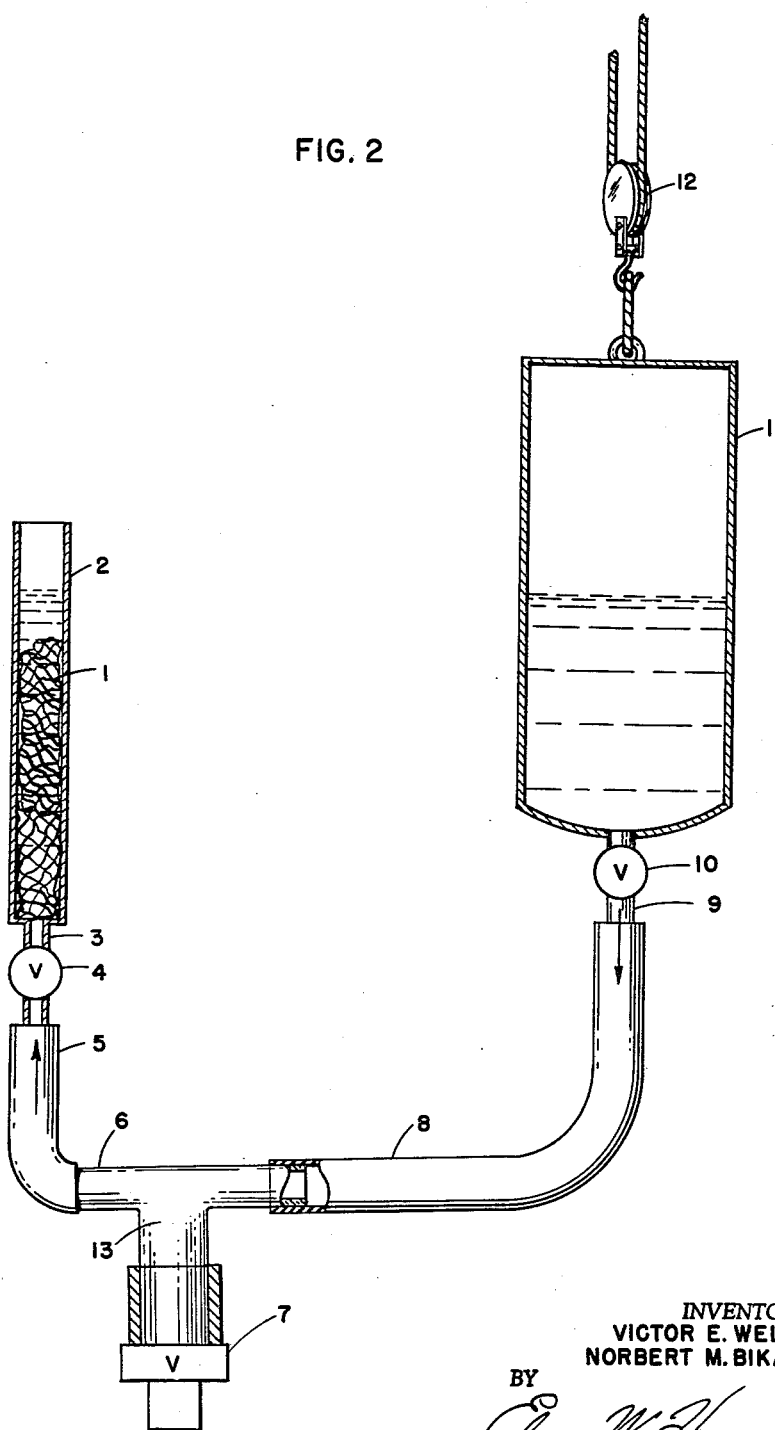

3,046,775
APPARATUS FOR TREATING RETICULATE
MATERIAL
Victor E. Wellman, Westfield, N.J., and Norbert M. Bikales, Stamford, Conn., assignors to American Cyanamid Company, New York, N.Y., a corporation of Maine
Original application Sept. 25, 1957, Ser. No. 686,134. Divided and this application Nov. 20, 1959, Ser. No. 854,321
1 Claim. (Cl. 68—147)

This invention relates to an apparatus for cyanoethylating reticulate cellulose fabrics and more particularly to the cyanoethylation of fishing nets.

The problem of adequate life for fishing nets is a very serious one, particularly for nets used in catching shrimp. These nets, when made of ordinary cotton, have a very short life, only a few months, as they are both torn and, what is more important, are attacked by microorganisms. The replacement of nets constitutes a very serious cost factor in commercial fishing, and particularly in fishing for shrimp in warm waters such as the Gulf of Mexico.

Commercial fishing is not a continuous occupation. There are frequent layovers of a number of days between trips of the vessel. This is especially true in the shrimp fishing industry. As a result fishermen have a considerable amount of free time. During such intervals, therefore, work can be done on the nets without incurring serious substantial additional labor costs.

It has been found that nets of cyanoethylated cotton or other cellulosic fiber have very much longer lives. Their tensile strength is also greater than untreated cotton. On the other hand, fishing nets constitute a comparatively small percentage of the total cotton yarn consumed, and cotton spinners do not find it worthwhile to install complicated equipment for cyanoethylation for so small a proportion of their production. As a result cyanoethylated fishing nets are not commercially available.

The present invention is directed to a simplified equipment whereby the user, the commercial fisherman, can cyanoethylate his own nets in his free time with a very small capital investment. By means of the present invention it has thus become possible for commercial fishermen to cyanoethylate nets cheaply and to effect great savings in their net cost.

In ordinary cyanoethylation processes, for example in the modern single-bath process for cyanoethylating cotton yarn in packages, elaborate equipment has been used in which the bath, which contains both aqueous caustic alkali and acrylonitrile, is circulated through the yarn packages to be treated. This process is adopted because of the very marked savings in acrylonitrile losses which are made possible as compared to the old and obsolete two-step or two-bath process in which the cotton, or other cellulose fiber, was first treated with alkali and then treated with acrylonitrile. In a large plant the savings, when due to reduced acrylonitrile losses, justify elaborate equipment which has a high capital cost.

The present process utilizes a two-step or two-bath procedure but is so modified as to permit operation by the net user without skill in the operation of chemical plants and at the same time keeps acrylonitrile losses far below the old two-step process, although it is not possible to match the extraordinarily low losses in a modern single-bath plant with its expensive installation and requirements for skilled operation and maintenance.

The present invention is made possible by the surprising discovery that the formation of $\beta,\beta'$-oxydipropionitrile occurs only in the separate aqueous alkali phase and not in the aqueous alkali dissolved in the acrylonitrile phase. In ordinary processes there is an excess of aqueous alkali over that chemically required in the cyanoethylation process, and this excess contributes proportionally about just as much to the by-product formation as the amount actually in contact with the cellulose. As will be described below, this excess is removed quickly and so the operation results in a reduced amount of by-product formation without requiring elaborate equipment.

The present invention also utilizes a combination of steps, elements, and conditions, some of which by themselves are known. The first of these is the use of low temperature, or at least elimination of heating, with a fairly concentrated aqueous caustic alkali as a catalyst, the concentration falling within the range of 7–12% and for optimum results approximating 8%. The second factor is the elimination of contact between large volumes of acrylonitrile and caustic alkali for any extended period of time.

Another important condition is the elimination of purification of used acrylonitrile. In most processes acrylonitrile is used in very large excess over the weight of the cellulose treated. Normally this excess will run from 5 to 10 or more times the weight of the cellulose. This large excess of acrylonitrile becomes contaminated with by-products, for example with reaction products of water and acrylonitrile which form $\beta,\beta'$-oxydipropionitrile. It has been standard practice to purify the acrylonitrile by separating it from the by-products before reuse, although it is customary to reuse acrylonitrile which contains some dissolved water.

In the operation of the present invention it has been found that the treatment of reticulate cellulosic material such as fishing nets can tolerate a very considerable contamination of acrylonitrile, up to 15% and more, without adversely affecting the quality of the final net and the efficiency of the process. This is in part due to the fact that it has been found unnecessary for the center of the cellulosic strands or yarns to be cyanoethylated to the same degree as the surface and the portion of the yarn lying only a little below the surface. This unevenness of cyanoethylation has been considered to render ordinary cyanoethylated fabrics for other uses of little value. It is most surprising that this is not true with nets because one would expect that nets which are subjected to long periods of soaking in sea water would peculiarly require a uniform high cyanoethylation even to the center of the yarns. Surprisingly, they do not, and nets in which the average degree of cyanoethylation, as represented conventionally by the nitrogen content, may be substantially below 3%, for example 2.4–2.9% are yet practically immune to microbiological damage in use. Of course, a net which has an average cyanoethylation of 2.5% nitrogen would have the surface substantially above 3%. No theory is advanced why a use which would peculiarly favor deep penetration of septic solutions does not adversely affect non-uniformly cyanoethylated material. In general, the average nitrogen content will range from 2 to 6%.

The present invention utilizes equipment of two or more containers, at least one of which can be raised and lowered. In the case of operation by fishermen, the raising and lowering can be by means of the cheapest and crudest methods, such as the ordinary block and tackle. At the same time, and this is a very important feature of the invention, provision is made for purging in such a way as to maintain contact of aqueous caustic alkali and acrylonitrile at a minimum. It is thus possible by very moderate purging, representing a relatively small acrylonitrile loss, to operate continuously, producing cyanoethylated nets of the highest quality and without any of the expensive equipment which is required for the purification of acrylonitrile in conventional cyanoethylation processes.

It should be understood that, in common with other cyanoethylation processes, the nature of the strong aqueous alkali used is not critical. For cost saving, sodium hydroxide is the most attractive alkali but, of course, potassium hydroxide, or mixtures, operates equally well, and it is even possible to operate with sodium carbonate, particularly mixtures of sodium carbonate and sodium hydroxide. However, if the alkali is too weak, the treatment cycle may be unduly lengthened and, therefore, it is preferred to use a strong alkali such as aqueous alkali metal hydroxide.

The acrylonitrile used can be of technical grade and may contain dissolved water since in the operation of the process it becomes contaminated both with water and with some by-product, such as $\beta,\beta'$-oxydipropionitrile. The equilibrium reached after a number of cycles of the present process represents an acrylonitrile purity which is much lower than even the lowest grade of technical acrylonitrile sold on the market. This is an added advantage of the present invention because it permits the use of the cheapest possible acrylonitrile and no care need be taken in its handling to prevent contamination except in the case of the strong alkali which is completely and automatically removed in the purge phase of each cycle. Also, since the equipment can be set up outdoors, the problem of toxic acrylonitrile fumes does not arise to the same extent as in an enclosed space and, therefore, the procedure is suitable even for comparatively unskilled users.

The process will be described in greater detail in connection with the drawings which are diagrammatic in nature and which show a very simple equipment setup. The description gives operating times which, it should be understood, are not critical and will vary for optimum results with the temperature of the day on which the process is carried out. The time factor is so non-critical that only very gross temperature changes require any substantial concern with time. The examples given are typical of operation on a moderately warm summer day.

FIG. 1 is a diagrammatic elevation, partly in section, of equipment at one stage of the process, and FIG. 2 is a similar elevation, partly in section, of the equipment at a different time in the cycle.

To start, net 1, tightly wound or in a bundle, is inserted in the relatively tall narrow container 2 which permits a relatively rapid flow through the net. An 8% aqueous sodium hydroxide solution containing a small amount, for example 0.4% of an alkali-stable wetting agent, such as sodium isopropyl naphthalene-sulfonate, is introduced into container 11 or, alternately, a container of this solution is connected on to the equipment. The container is raised by the block and tackle 12 as shown in FIG. 2 the valve 7 remains closed and the valves 4 and 10 are opened. As a result the aqueous caustic soda solution flows downwardly from container 11 through the pipe 9 into a flexible hose 8 through a transparent T 6 of which enlarged portion 13 is used as a trap, a second flexible hose 5 and through tube 3 into container 2.

The container 11 is raised and lowered rapidly a few times, about five, in order to thoroughly wet the net. Thereupon, the container is left in its raised position for about 30 minutes in order to soak the net thoroughly with the caustic soda. During the 30 minutes the container is raised and lowered about twice to provide a little circulation.

Thereupon, valve 7 is opened, permitting the sodium hydroxide solution to drain out of the containers 2 and 11 and, of course, out of the hoses 5 and 8. This caustic alkali may be discarded or, if desired, it may be saved for reuse. However, the volume is fairly small and it is often discarded. Valve 7 is closed, container 11 is then filled with acrylonitrile, or a container of acrylonitrile substituted for it, the container raised to the position of FIG. 2. Acrylonitrile runs into the container 2 and the level of container 11 is adjusted so that the net is just covered. As in the case of the sodium hydroxide solution, the container 11 is lowered and raised several times and then the acrylonitrile allowed to stand in contact with the net for about 10 minutes. The container 11 is then lowered to permit drainage of acrylontrile from the container 2. However, the bottom of the container 11 is not permitted to drop below the level of the T 6. Since the net retains an excess of aqueous alkali from the first treatment, a rapid removal is desirable. Again a surprising phenomenon occurs. The excess aqueous alkali is very quickly displaced by acrylonitrile. The trap 13 is provided to collect the displaced sodium hydroxide layer which sinks into the trap because its specific gravity is markedly higher than that of the acrylonitrile phase. Valve 7 is now opened, draining out this sodium hydroxide layer, and closed again when the acrylonitrile phase begins to run through.

Container 11 is again raised, immersing the net in acrylonitrile. The cycle is repeated at 10-minute intervals for a total of approximately 90 minutes. Finally, after draining out the small residue of aqueous phase, the container 11 is lowered sufficiently so that all liquid drains out of container 2 but hose 8 remains full and hose 5 at least partly full. The bottom of container 11 remains above trap 13. Valve 10 is then closed and valve 7 opened, draining out the contents of hoses 5 and 8 and trap 13. This removes the last of the aqueous sodium hydroxide layer and purging a portion of the acrylonitrile. Valve 10 is then opened and the contents of container 11 drained into another container (not shown), and reused. If separate containers 11 for different chemicals are used, the container 11 is simply disconnected.

Container 11 is filled with dilute acetic acid and raising and lowering of the container repeated as above, finally allowing the net to soak for about an hour. The acetic acid is then drained off and the net washed with water.

The process is repeated three times with three other nets, constituting four runs. The following table, in which the amounts of acrylonitrile and aqueous alkali are given by weight, shows the results obtained. It will be noted that the loss of acrylonitrile in purging is very moderate and that the purity of the acrylonitrile drops to about 85%, which represents approximately an equilibrium.

| Run | Net | Acrylonitrile used | Acrylonitrile recovered | | Average percent nitrogen |
|---|---|---|---|---|---|
| | | | Parts | Percent purity | |
| 1 | 36.0 | 120 | 89 | 93.8 | 2.5 |
| 2 | 36.5 | 89 recov. +28 fresh | 88 | 90.4 | 2.4 |
| 3 | 38.5 | 88 recov. +28 fresh | 85 | 86.2 | 2.4 |
| 4 | 28.0 | 85 recov. +24 fresh | 80 | 85.8 | 2.9 |

It will be noted that the loss of acrylonitrile is somewhat less than the weight of the net, an amazingly low acrylonitrile loss considering the crudeness of the equipment and the fact that the obsolete and inherently less efficient two-step process is used. A not inconsiderable portion of this saving may be due to the fact that no attempt is made to purify the acrylonitrile for reuse, other than the incidental effect of the small purges. The process is practically and commercially attractive as it permits cyanoethylation of nets at a cost which is a fraction of the original cost of the net.

Other cyanoethylation processes in which long contact of the acrylonitrile with the residual sodium hydroxide is involved have sometimes resulted in a considerable degree of hydrolysis of cyanoethyl groups to carboxyethyl groups. Extensive hydrolysis is undesirable and the average for the four runs above was about 0.045 milliequivalents of carboxyethyl groups per gram of net, a very satisfactory low figure showing that the cyanoethylated net was of high quality.

As was pointed out above, temperature, while not critical, does have some effect. In general times are reduced from 10–20% in extremely hot weather and may be lengthened on days colder than average summer days.

The process has been illustrated with the raising and lowering equipment applied to the reagent container. This is frequently the best arrangement but, of course, the only effect is to create a level difference between the containers 2 and 11 and this may be effected just as well by keeping the container 11 at a stationary level and raising and lowering container 2. It is of course possible to raise and lower both containers, but this added complication is normally unnecessary. A plurality of containers 11 may be provided connected through valved pipes into the same hose 8 or 5 where is is desired to avoid the necessity of connecting and disconnecting the operation of the process, and the equipment is not thereby changed. The drawings illustrate a container with special bead eye for receiving the raising and lowering sling. This is convenient as it prevents any danger of a container slipping. However, if it is desired to use the steel drums in which the acrylonitrile is ordinarily sold as the container, suitable rope slings may be used. The drawings are therefore merely diagrammatically illustrative of the invention without limiting the nature of the container 11.

The invention has been described in connection with the cyanoethylation of nets which is the most important present field. However, the invention is applicable to other reticulate materials, such as the loosely woven tobacco shade cloths, sand bags, etc.

As such the present invention constitutes a division of our copending application Serial No. 686,134, filed September 25, 1957.

We claim:

In an apparatus for the cyanoethylation of reticulate cellulosic material, said apparatus comprising:
  a small first container, adapted to receive compacted reticulate material,
    said first container having a closed bottom, an open port in said bottom, a first short conduit extending vertically downward from said port and a first valve in said first conduit;
  a large second container adapted to contain reactant liquor,
    said second container having a closed bottom with an open port therein, a second short conduit extending vertically downward from the said open port in the bottom of said second container and a second valve in said second conduit;
  a flexible U-shaped conduit connecting the lower open ends of said first and second short conduits below said first and second valves; a first mounting means for one of said first and second containers; a vertically-movable supporting means for the other of said first and second containers,
    said movable supporting means being adapted to raise or lower the elevation of the container supported thereby relative to the elevation of the container mounted in said first mounting means, whereby liquid may be caused to flow from either of said containers through said U-shaped conduit into the other container;
  the improvement which comprises the combination therewith of a T-shaped trap,
    two horizontal arms of said T being interposed in said U-shaped conduit at a point in the length thereof which is at the lowest level below the bottom of both said containers at all positions of said movable mounting means, the vertical arm of said T extending vertically downward and adapted to serve as a container for material settling from liquid in said U-shaped tube, whereby material in said vertical arm of said T is prevented from return to either of said containers; and
  a valve means in the lower part of said vertical arm.

References Cited in the file of this patent
UNITED STATES PATENTS

| | | |
|---|---|---|
| 373,420 | Suits | Nov. 15, 1887 |
| 764,750 | Munger | July 12, 1904 |
| 1,054,990 | Schwoerer | Mar. 4, 1913 |
| 1,121,339 | Earle | Dec. 15, 1914 |
| 2,808,715 | Mellgren | Oct. 8, 1957 |

FOREIGN PATENTS

| | | |
|---|---|---|
| 513,370 | Canada | May 31, 1955 |
| 1,156,242 | France | Dec. 9, 1957 |